United States Patent
Yura et al.

(10) Patent No.: US 11,329,270 B2
(45) Date of Patent: May 10, 2022

(54) LITHIUM COMPLEX OXIDE SINTERED BODY PLATE

(71) Applicant: NGK INSULATORS, LTD., Nagoya (JP)

(72) Inventors: Yukinobu Yura, Nagoya (JP); Nobuyuki Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 160 days.

(21) Appl. No.: 16/534,293

(22) Filed: Aug. 7, 2019

(65) Prior Publication Data

US 2019/0363343 A1    Nov. 28, 2019

Related U.S. Application Data

(63) Continuation of application No. PCT/JP2018/003918, filed on Feb. 6, 2018.

(30) Foreign Application Priority Data

Feb. 21, 2017 (JP) .............................. JP2017-030010
May 22, 2017 (JP) .............................. JP2017-101056
Dec. 20, 2017 (JP) .............................. JP2017-244167

(51) Int. Cl.
| | | |
|---|---|---|
| *H01M 4/131* | (2010.01) | |
| *H01M 10/0525* | (2010.01) | |
| *H01M 4/525* | (2010.01) | |
| *H01M 4/04* | (2006.01) | |
| *H01M 4/02* | (2006.01) | |

(52) U.S. Cl.
CPC ......... *H01M 4/131* (2013.01); *H01M 4/0471* (2013.01); *H01M 4/525* (2013.01); *H01M 10/0525* (2013.01); *H01M 2004/021* (2013.01); *H01M 2004/028* (2013.01)

(58) Field of Classification Search
CPC ..... H01M 4/131–1315; H01M 4/1391–13915; H01M 4/0471
See application file for complete search history.

(56) References Cited

U.S. PATENT DOCUMENTS

| | | | | |
|---|---|---|---|---|
| 2010/0117031 A1* | 5/2010 | Akagi | ................. | H01M 4/0471 |
| | | | | 252/500 |
| 2012/0009470 A1 | 1/2012 | Sugiura et al. | | |
| 2012/0009471 A1 | 1/2012 | Sugiura et al. | | |
| 2013/0330613 A1* | 12/2013 | Saruwatari | ............ | H01M 4/661 |
| | | | | 429/211 |
| 2015/0086851 A1* | 3/2015 | Morita | ................ | H01M 10/052 |
| | | | | 429/163 |

FOREIGN PATENT DOCUMENTS

| | | | |
|---|---|---|---|
| CN | 105140463 A | * | 12/2015 |
| JP | 2001-143687 A1 | | 5/2001 |
| JP | 2012-009193 A1 | | 1/2012 |
| JP | 2012-009194 A1 | | 1/2012 |
| JP | 2013-175405 A1 | | 9/2013 |
| JP | 2014024740 A | * | 2/2014 |
| JP | 5587052 B2 | | 9/2014 |
| JP | 5703409 B2 | | 4/2015 |
| JP | 5752303 B2 | | 7/2015 |
| JP | 2015153695 A | * | 8/2015 |

OTHER PUBLICATIONS

International Search Report and Written Opinion (Application No. PCT/JP2018/003918) dated May 15, 2018 (with English translation).

* cited by examiner

*Primary Examiner* — William E McClain
*Assistant Examiner* — Jessie L. Walls
(74) *Attorney, Agent, or Firm* — Burr & Brown, PLLC

(57) ABSTRACT

Disclosed is a lithium complex oxide sintered plate for use in a positive electrode of a lithium secondary battery. The lithium complex oxide sintered plate has a structure in which a plurality of primary grains having a layered rock-salt structure are bonded, and has a porosity of 3 to 30%, a mean pore diameter of 15 μm or less, an open pore rate of 70% or more, a thickness of 40 to 200 μm, a primary grain diameter of 20 μm or less, the primary grain diameter being a mean diameter of the primary grains, and a pore diameter distribution in which the number of peaks is one and volume-based D10, D50 and D90 pore diameters satisfy expressions: $D50/D10 \geq 2.5$, $D90/D50 \geq 2.5$ and $D90/D10 \geq 8.0$.

6 Claims, No Drawings

LITHIUM COMPLEX OXIDE SINTERED BODY PLATE

CROSS-REFERENCE TO RELATED APPLICATIONS

This application is a continuation application of PCT/JP2018/003918 filed Feb. 6, 2018, which claims priority to Japanese Patent Application No. 2017-030010 filed Feb. 21, 2017, Japanese Patent Application No. 2017-101056 filed May 22, 2017, and Japanese Patent Application No. 2017-244167 filed Dec. 20, 2017, the entire contents all of which are incorporated herein by reference.

BACKGROUND OF THE INVENTION

1. Field of the Invention

The present invention relates to a lithium complex oxide sintered plate for use in a positive electrode of a lithium secondary battery.

2. Description of the Related Art

Powder-dispersed positive electrodes are widely known as layers of positive electrode active material for lithium secondary batteries (also referred to as lithium ion secondary batteries), and are usually produced by kneading and molding particles of lithium complex oxide (typically, lithium-transition metal oxide) and additives, such as binders or conductive agents. Such powder-dispersed positive electrodes contain a relatively large amount (e.g., about 10% by weight) of binder that does not contribute to the capacity of battery, resulting in a low packing density of the positive electrode active material, i.e., lithium complex oxide. Accordingly, the powder-dispersed positive electrode should be greatly improved from the viewpoint of the capacity and charge/discharge efficiency.

Some attempts have been made to improve the capacity and charge/discharge efficiency by positive electrodes or layers of positive electrode active material composed of lithium complex oxide sintered plate. In this case, since the positive electrode or the layer of positive electrode active material contains no binder, high capacity and satisfactory charge/discharge efficiency can be expected due to a high filling density of lithium complex oxide.

For example, PTL 1 (JP5587052B) discloses a positive electrode including a current collector of the positive electrode and a positive electrode active material layer connected to the current collector of the positive electrode with a conductive bonding layer therebetween. The layer of positive electrode active material is composed of a lithium complex oxide sintered plate, and the sintered plate has a thickness of 30 µm or more, a porosity of 3 to 30%, and an open pore rate of 70% or more. In addition, the lithium complex oxide sintered plate has a structure in which a large number of primary grains is bonded, the grains having a grain diameter of 5 µm or less, having a layered rock-salt structure, and exhibiting a ratio [003]/[104] of the diffraction intensity on the (003) plane to the diffraction intensity on the (104) plane in X-ray diffractometry of 2 or less.

PTL 2 (JP5752303B) discloses a lithium complex oxide sintered plate for use in a positive electrode of a lithium secondary battery, and the lithium complex oxide sintered plate has a thickness of 30 µm or more, a porosity of 3 to 30%, and an open pore rate of 70% or more. In addition, the lithium complex oxide sintered plate has a structure in which a large number of primary grains is bonded, the grains having a grain diameter of 2.2 µm or less, having a layered rock-salt structure, and exhibiting a ratio [003]/[104] of the diffraction intensity on the (003) plane to the diffraction intensity on the (104) plane in X-ray diffractometry of 2 or less.

PTL 3 (JP5703409B) discloses a lithium complex oxide sintered plate for use in a positive electrode of a lithium secondary battery, and the lithium complex oxide sintered plate has a structure in which a large number of primary grains is bonded, the grains having a grain diameter of 5 µm or less. In addition, the lithium complex oxide sintered plate has a thickness of 30 µm or more, a mean pore diameter of 0.1 to 5 µm, and a porosity of 3% or more to less than 15%. The lithium complex oxide sintered plate also exhibits a ratio [003]/[104] of the diffraction intensity on the (003) plane to the diffraction intensity on the (104) plane in X-ray diffractometry of 2 or less.

All PTLs 1 to 3 have addressed the problem of deterioration in cycle characteristics (capacity retention characteristics when charge/discharge cycles are repeated) in a region having a significantly high filling rate of lithium complex oxide in the sintered plate. In detail, the PTLs have found that the deterioration of cycle characteristics is caused by cracking at grain boundaries in the sintered plate (hereinafter, grain boundary cracking) and separation at the interface between the sintered plate and the conductive bonding layer (hereinafter, bonding interface separation), and solved the above problem through restraining such grain boundary cracking and bonding interface separation.

CITATION LIST

Patent Literature

PTL1: JP5587052B
PTL2: JP5752303B
PTL3: JP5703409B

SUMMARY OF THE INVENTION

Nowadays, miniaturized batteries for smart cards and wearable devices are being increasingly demanded. In order to achieve high capacity and high energy density, use of thick lithium complex oxide sintered plate is advantageous for positive electrodes or layers of positive electrode active material in such miniaturized batteries. In contrast, miniaturized batteries for smart cards and wearable devices require specific performance depending on usage pattern. For example, batteries used under situations where bending stress is readily applied require high resistance to bending (hereinafter, referred to as bending resistance). In addition, rapid charge characteristics are desired in batteries used under a situation where users constantly carry them.

The present inventors have now confirmed the following findings: A thick sintered plate having high energy density can be prepared through adjusting the pore diameter distribution within a specific profile in a predetermined lithium complex oxide sintered plate. A lithium secondary battery including such a thick lithium complex oxide sintered plate as a positive electrode exhibits high bending resistance and high performance, such as rapid charge characteristics.

Accordingly, an object of the present invention is to provide a lithium complex oxide sintered plate having large thickness, the sintered plate being capable of exhibiting high bending resistance and high performance, such as rapid charge characteristics while having high energy density when incorporated as a positive electrode into a lithium secondary battery.

One embodiment of the present invention provides a lithium complex oxide sintered plate for use in a positive electrode of a lithium secondary battery. The lithium complex oxide sintered plate has a structure in which a plurality of primary grains having a layered rock-salt structure are bonded, and has a porosity of 3 to 30%, a mean pore diameter of 15 µm or less, an open pore rate of 70% or more, and a thickness of 40 to 200 µm, a primary grain diameter, i.e., a mean diameter of the primary grains, of 20 µm or less, and a pore diameter distribution in which the number of peaks is one and volume-based D10, D50 and D90 pore diameters satisfy expressions: D50/D10≥2.5, D90/D50≥2.5, and D90/D10≥8.0.

DETAILED DESCRIPTION OF THE INVENTION

Definition

The definitions of the parameters are given below for specifying the present invention.

In the present specification, the term "porosity" refers to the volume rate of pores (including open pores and closed pores) in a lithium complex oxide sintered plate. The porosity can be measured by analysis of a cross-sectional SEM image of the sintered plate. For example, the sintered plate is processed with a cross-section polisher (CP) to expose a polished cross-section. The polished cross-section is observed with a SEM (scanning electron microscope) at a predetermined magnification (for example, 1000 folds) and a predetermined field of view (for example, 125 µm×125 µm). The resulting SEM image is analyzed to divide the total area of all pores in the field of view by the whole area (cross-sectional area) of the sintered plate in the field of view, and the resultant value is multiplied by 100 to give the porosity (%).

In the present specification, the term "mean pore diameter" refers to a volume-based D50 pore diameter in a pore diameter distribution (an accumulated distribution) measured in the lithium complex oxide sintered plate where the abscissa indicates the pore diameter and the ordinate indicates the cumulative volume percent (relative to 100% of the total pore volume). The volume-based D50 pore diameter has the same meaning as a volume-based D50 particle diameter widely known in a particle distribution of powder. Accordingly, the volume-based D50 pore diameter indicates the pore diameter at which the cumulative pore volume reaches 50% of the total pore volume. The pore diameter distribution may be measured by the mercury intrusion process with a mercury porosimeter.

In the present specification, the term "open pore rate" refers to the volume rate (vol %) of open pores to all the pores (including open pores and closed pores) contained in the lithium complex oxide sintered plate. The "open pores" refer to pores that are in communication with the outside of the sintered plate among all pores contained in the sintered plate. The "closed pores" refers to the pores that are not in communication with the outside of the sintered plate among all pores contained in the sintered plate. The open pore rate can be calculated from the total porosity corresponding to the sum of open and closed pores based on the bulk density, and the closed porosity corresponding to closed pores based on the apparent density. The parameters used for calculation of the open pore rate may be measured by, for example, the Archimedes method. For example, the closed porosity (vol %) can be determined from the apparent density measured by the Archimedes method, and the total porosity (vol %) can be determined from the bulk density measured by the Archimedes method. Accordingly, the open pore rate can be determined from the closed porosity and the total porosity by the following expression.

(open pore rate) = (open porosity)/(total porosity)

= (open porosity)/[(open porosity) + (closed porosity)]

= [(total porosity) − (closed porosity)]/(total porosity)

In the present specification, the term "primary grain diameter" refers to the mean grain diameter of the primary grains in the lithium complex oxide sintered plate. The primary grain diameter can be measured by analysis of a cross-sectional SEM image of the sintered plate. For example, the sintered plate is processed with a cross-section polisher (CP) to expose a polished cross section. The polished cross-section is observed by SEM (scanning electron microscopy) at a predetermined magnification (for example, 1000 folds) and a predetermined field of view (for example, 125 µm×125 µm). In this case, the field of view is selected such that 20 or more primary grains are located in this field. In the resultant SEM image, circumscribed circles are drawn for all primary grains and the diameters of circumscribed circles are measured. From this measurement, the mean value of these diameters is defined as the primary grain diameter.

In the present specification, the term "number of peaks in a pore diameter distribution" refers to the number of peaks in the pore diameter distribution (a frequency distribution) measured in the lithium complex oxide sintered plate where the abscissa indicates the pore diameter and the ordinate indicates the volume percent. The peak is defined as an inflection point in the pore diameter distribution, where the volume percent continuously increases or decreases at ten points or more before and after the inflexion point. The pore diameter distribution may be measured by a mercury intrusion process with a mercury porosimeter.

Throughout the specification, the term "volume-based D10, D50 and D90 pore diameters" refers to volume-based D10, D50 and D90 pore diameters in the pore diameter distribution (an cumulative distribution) measured with the lithium complex oxide sintered plate where the abscissa indicates the pore diameter and the ordinate indicates the cumulative volume percent (relative to the total pore volume 100%). The volume-based D10, D50 and D90 pore diameters in the pore diameter distribution has the same meaning as the volume-based D10, D50 and D90 particle diameters widely known in particle diameter distributions of powder. Accordingly, the volume-based D10, D50 and D90 pore diameters indicate pore diameters at which the cumulative pore volume reaches 10%, 50% and 90% of the total pore volume, respectively. The pore diameter distribution can be measured by a mercury intrusion method using a mercury porosimeter.

Lithium Complex Oxide Sintered Plate

The lithium complex oxide sintered plate according to the present invention is used in a positive electrode of a lithium secondary battery. The lithium complex oxide sintered plate has a structure in which a plurality of primary grains having a layered rock-salt structure is bonded. The lithium complex oxide sintered plate has a porosity of 3 to 30%, a mean pore diameter of 15 μm or less, an open pore rate of 70% or more, a thickness of 40 to 200 μm.

Furthermore, the lithium complex oxide sintered plate has a primary grain diameter, which is a mean grain diameter of primary grains, of 20 μm or less, and has a pore diameter distribution in which the number of peaks is one and volume-based D10, D50 and D90 pore diameters satisfy the expressions: D50/D10≥2.5, D90/D50≥2.5, and D90/D10≥8.0. In this manner, the predetermined lithium complex oxide sintered plate can be controlled to be a specific profile in the pore diameter distribution, and thereby the lithium complex oxide sintered plate having a large thickness can be provided exhibiting high bending resistance and high performance, such as rapid charge characteristics, while having high energy density when incorporated as a positive electrode in a lithium secondary battery.

As described above, in order to achieve high capacity and high energy density, use of thick lithium complex oxide sintered plate is advantageous for positive electrodes or layers of positive electrode active material in such miniaturized batteries. In contrast, miniaturized batteries for smart cards and wearable devices require specific performance depending on usage pattern. For example, batteries used in situations where bending stress is readily applied require high resistance to bending (hereinafter, referred to as bending resistance). In addition, batteries used in a situation where users constantly carry them require rapid charge characteristics. However, it has been found that the capacity retention decreases or the short circuit occurs in a bending test for a liquid-base high-energy-density battery (thin lithium battery) composed of a positive electrode plate, which is merely a thick conventional lithium complex oxide sintered plate, in combination with an organic electrolytic solution or an ionic liquid. Moreover, it has also been found that the capacity retention decreases during the charge/discharge cycle test at a high rate (2C) for the similar liquid-base high energy density battery (thin lithium battery). In this respect, the lithium complex oxide sintered plate having the above structure in the present invention can prevent or reduce deterioration of the battery performance even in a bending resistance test and a cycle test at a high rate. Although the reason is not clear, it is believed that the bending stress during charge/discharge cycles (ununiform stress caused by expansion and contraction) is advantageously dispersed and relieved due to, for example, the specific pore diameter distribution as described above. As a result, the lithium complex oxide sintered plate in the present invention is believed to exhibit high bending resistance and high performance, such as rapid charge characteristics, when incorporated as a positive electrode into a lithium secondary battery while having high energy density and large thickness of the plate.

The lithium complex oxide sintered plate has a structure that a plurality of (namely, a large number of) primary grains is bonded having a layered rock-salt structure. Accordingly, these primary grains are composed of a lithium complex oxide having a layered rock-salt structure. The lithium complex oxide is an oxide represented as typically $Li_xMO_2$ (0.05<x<1.10, M includes at least one transition metal, for example, one or more selected from Co, Ni and Mn). Typical lithium complex oxides have a layered rock-salt structure. The layered rock-salt structure refers to a crystalline structure that lithium layers and transition metal layers other than lithium are alternately stacked with oxygen layers interposed therebetween. That is, the layered rock-salt structure is a crystalline structure that transition metal ion layers and single lithium layers are alternately stacked with oxide ions therebetween (typically, an α-NaFeO$_2$ structure: a cubic rock-salt structure in which transition metal and lithium are regularly disposed in the [111] axis direction).

Preferred examples of the lithium complex oxide having a layered rock-salt structure include, preferably lithium cobaltate $Li_pCoO_2$ (wherein, 1≤p≤1.1), lithium nickelate $LiNiO_2$, lithium manganate $Li_2MnO_3$, lithium nickel manganate $Li_p(Ni_{0.5},Mn_{0.5})O_2$, a solid solution represented by the general formula: $Li_p(Co_x,Ni_y,Mn_z)O_2$ (wherein, 0.97≤p≤1.07, x+y+z=1), a solid solution represented by the general formula: $Li_p(Co_x,Ni_y,Al_z)O_2$ (wherein, 0.97≤p≤1.07, x+y+z=1, 0<x≤0.25, 0.6≤y≤0.9, and 0<z≤0.1), and a solid solution of $Li_2MnO_3$ and $LiMO_2$ (M is a transition metal, such as Co and Ni), and particularly preferably lithium cobaltate $Li_pCoO_2$ (wherein, 1≤p≤1.1), for example, $LiCoO_2$. The lithium complex oxide sintered plate may further include one or more elements of Mg, Al, Si, Ca, Ti, V, Cr, Fe, Cu, Zn, Ga, Ge, Sr, Y, Zr, Nb, Mo, Ag, Sn, Sb, Te, Ba and Bi.

The primary grain diameter, which is the mean grain diameter of the plurality of primary grains constituting the lithium complex oxide sintered plate, is 20 μm or less, preferably 15 μm or less. The primary grain diameter is typically 0.1 μm or more, more typically 0.5 μm or more. In general, as the primary grain diameter decreases, the number of grain boundaries increases. As the number of grain boundaries increases, the internal stress generated in the expansion and contraction of the crystalline lattice accompanying the charge and discharge cycles is appropriately dispersed. In addition, even when cracking occurs, a larger number of grain boundaries blocks the growth of cracks. In contrast, grains of the sintered plate in the present invention are highly orientated, and thereby the stress is not readily concentrated to the grain boundaries, resulting in high cycle characteristics even at large grain diameters. In addition, in the case that the grain diameters are large, the diffusion of lithium during charge and discharge cycles is less likely to be blocked at grain boundaries, which is suitable for rapid charge/discharge.

The lithium complex oxide sintered plate includes pores. The pores included in the sintered plate appropriately or uniformly release the stress occurring by expansion and contraction of the crystalline lattice accompanying the intercalation and deintercalation of lithium ions during the charge/discharge cycles. In this mechanism, the grain boundary cracking during repetition of charge/discharge cycles is effectively restrained. In addition, the pores (open pores) in the interface on the conductive bonding layer can increase the bonding strength. The separation at the above bonding interface is appropriately restrained, the separation resulting from the deformation of the lithium complex oxide sintered plate due to the expansion and contraction of the crystalline lattice accompanying the intercalation and deintercalation of lithium ions during charge/discharge cycles. As a result, the capacity can be increased while retaining satisfactory cycle characteristics.

The open pore rate of the lithium complex oxide sintered plate is 70% or more, more preferably 80% or more, and further more preferably 90% or more. The open pore rate may be 100%, typically 98% or less, more typically 95% or less. An open pore rate of 70% or more may more readily release the stress and effectively restrain the cracking at grain boundaries. This effect is likely to be caused by the following reasons. The expansion and contraction of the volume in the positive electrode are caused by the intercalation and deintercalation of lithium ions in the crystalline lattice as described above. The open pore is surrounded by the faces through which lithium ions intercalate and deintercalate. In this configuration, open pores are probably more effective in relieving stress than closed pores. An open pore rate of 70% or more can effectively restrain the separation at bonding interfaces. This advantage is believed to be based on high bonding strength due to an anchor effect caused by an increase in surface roughness by the incorporated open pores, as the open pores can be regarded as affecting surface roughness. In addition, the electrolyte and the conductive material contained in the open pores allows the inner walls of the open pores to effectively serve as surfaces through which lithium ions intercalate and deintercalate. An open pore rate of 70% or more can accordingly improve the rate characteristic as compared with a high closed pore rate in which many closed pores are present as mere pores (portions which do not contribute to charge/discharge).

The lithium complex oxide sintered plate has a porosity of 3 to 30%, more preferably 5 to 30%, further more preferably 7 to 30%, particularly more preferably 10 to 25%. A porosity of less than 3% causes the pore to insufficiently release the stress. A porosity exceeding 30% significantly diminishes the effect of increasing capacity.

The lithium complex oxide sintered plate has a mean pore diameter of 15 μm or less, preferably 12 μm or less, more preferably 10 μm or less. A mean pore diameter exceeding 15 μm leads to generation of relatively large pores. Such large pores usually do not have an exact spherical shape, but have irregular shapes. In such irregular shapes, the stress concentration is likely to occur at local sites in large pores. Accordingly, the stress cannot be uniformly released in the sintered plate. Although the lower limit of the mean pore diameter may be any value, the mean pore diameter is preferably 0.03 μm or more, and more preferably 0.1 μm or more from the viewpoint of the stress relief effect in the pores. As a result, the above range appropriately restrains the cracking at grain boundaries and separation at bonding interfaces.

The sintered lithium complex oxide plate has a single peak in the pore diameter distribution. In addition, the volume-based D10, D50 and D90 pore diameters in the lithium complex oxide sintered plate satisfy the expressions: $D50/D10 \geq 2.5$, $D90/D50 \geq 2.5$, and $D90/D10 \geq 8.0$. The relation in the single peak indicates that the pore diameter distribution is a gently-sloping (broad) normal distribution or a similar distribution. In other words, the relation of $D50/D10 \geq 2.5$ indicates that the pore diameter of D10 is significantly distant from that of D50. The relation of $D90/D50 \geq 2.5$ also indicates that the pore diameters of D50 is significantly distant from that of D90. The relation of $D90/D10 \geq 8.0$ also indicates that the pore diameters of D10 is further more significantly distant from that of D90. Accordingly, the above three relations generally indicate that the pore diameters of D10, D50 and D90 are significantly separated from one another, that is, the pore diameters have a broad distribution. This specific pore diameter distribution can advantageously disperse the stress when the battery is bent and the stress during charge/discharge cycles, result in achieving high bending resistance and superior operational characteristics, such as high rapid charge characteristics.

The ratio D50/D10 is 2.5 or more, preferably 2.8 to 20, more preferably 3.0 to 18.5, further more preferably 3.5 to 17. The ratio D90/D50 is 2.5 or more, preferably 2.7 to 20, more preferably 2.8 to 18.5, further more preferably 3.0 to 17.1. The ratio D90/D10 is 8.0 or more, preferably 10 to 150, more preferably 20 to 135, further more preferably 30 to 120.

The lithium complex oxide sintered plate has a ratio [003]/[104] of preferably 5.0 or less, more preferably 4.0 or less, further more preferably 3.0 or less, particularly more preferably 2.0 or less, where the ratio [003]/[104] indicates the ratio of the diffraction intensity (peak intensity) on the (003) plane to the diffraction intensity (peak intensity) on the (104) plane in X-ray diffractometry. In this measurement, the X-ray diffractometry is performed on the plate face (namely, the face perpendicular to the thickness of the plate) of the lithium complex oxide sintered plate. A lower ratio [003]/[104] in the peak intensity causes the cycle characteristics to be more greatly improved. The reason is believed as follows: The expansion and contraction (expansion and contraction in volume) of the crystalline lattice accompanied with charge/discharge cycles is the largest in the direction perpendicular to the (003) plane (i.e., the [003] direction). In this mechanism, cracking resulting from the expansion and contraction of the crystalline lattice accompanied with the charge/discharge cycles tends to occur parallel to the (003) plane. In addition, the (003) plane is a close-packed plane of oxygen, and is a chemically and electrochemically inactive plane where lithium ions and electrons cannot intercalate and deintercalate. In this respect, a lower ratio [003]/[104] in the peak intensity as described above indicates a smaller proportion of the (003) plane that appears parallel with the plate face on the plate face in the lithium complex oxide sintered plate, at the bonding interface with the positive electrode current collector, and inside the lithium complex oxide sintered plate. A decrease in the proportion of the (003) plane appearing at the bonding interface can increase the adhesion strength at the bonding interface to avoid the separation, and effectively restrain cracking at the grain boundary parallel to the plate face, which particularly affects the capacity reduction, resulting in an improvement in cycle characteristics. The lower limit of the ratio [003]/[104] in the peak intensity may be any value, but is typically 1.16 or more, more typically 1.2 or more.

The lithium complex oxide sintered plate has a thickness of 40 to 200 μm, preferably 50 to 200 μm, more preferably 80 to 200 μm, further more preferably 100 to 200 μm. As described above, the lithium complex oxide sintered plate having larger thickness can lead to higher capacity and higher energy density. The thickness of the lithium complex oxide sintered plate is determined by measuring the distance between the two substantially parallel faces of the plate, for example, when the cross section of the lithium complex oxide sintered plate is observed by SEM (scanning electron microscopy).

Process

The lithium complex oxide sintered plate in the present invention may be produced by any method, and preferably produced through (a) preparation of a green sheet containing a lithium complex oxide, (b) preparation of a green sheet containing an excess-lithium source, and (c) laminating and firing of these green sheets.

(a) Preparation of Green Sheet Containing Lithium Complex Oxide

A raw material powder composed of lithium complex oxide is prepared. This powder preferably comprises pre-synthesized particles (e.g., $LiCoO_2$ particles) having a composition of $LiMO_2$ (M as described above). The volume-based D50 particle diameter of the raw material powder is preferably 0.1 to 20 μm. As the particle diameter increases in the raw material powder, the pore size tends to increase.

The raw material powder is then mixed with a dispersive medium and any additive (e.g., binder, plasticizer, and dispersant) to form a slurry. A lithium compound (e.g., lithium carbonate) in an excess amount of about 0.5 to 30 mol % other than $LiMO_2$ may be added to the slurry to promote grain growth and compensate for a volatile component in a firing process described later. The slurry preferably contains no pore-forming agent. The slurry is defoamed by stirring under reduced pressure, and the viscosity is preferably adjusted into 4000 to 10000 cP. The resultant slurry is molded into a sheet to give a green sheet containing lithium complex oxide. The resultant green sheet is in a form of independent sheet. An independent sheet (also referred to as a "self-supported film") refers to a sheet (including flakes having an aspect ratio of 5 or more) that can be independently handled in a singular form apart from other supports. In other words, the independent sheet is not the one that is fixed to a support (such as a substrate) and integrated with the support (so as to be inseparable or hard to separate). The sheet may be formed by various known procedures, and preferably formed by a doctor blade process. The thickness of the green sheet containing the lithium complex oxide may be appropriately selected so as to give the above desired thickness after firing.

(b) Preparation of Green Sheet Containing Excess-Lithium Source

Besides the above green sheet containing lithium complex oxide, another green sheet containing an excess-lithium source is then prepared. The excess-lithium source is preferably a lithium compound other than $LiMO_2$. The components other than Li in the compound evaporate during firing. A preferred example of such a lithium compound (an excess-lithium source) is lithium carbonate. The excess-lithium source is preferably powder, and has a volume-based D50 particle diameter of preferably 0.1 to 20 μm, more preferably 0.2 to 15 μm. The lithium source powder is mixed with a dispersive medium and additives (e.g., a binder, a plasticizer, and a dispersant) to form a slurry. The resulting slurry is defoamed by stirring under reduced pressure, and the viscosity is preferably adjusted into 4000 to 10000 cP. The slurry is molded into a green sheet containing an excess-lithium source. The resultant green sheet is also in a form of independent sheet. The sheet can be formed by any known process, and preferably formed by a doctor blade process. The thickness of the green sheet containing the excess-lithium source is appropriately selected, such that the molar ratio (Li/Co ratio) of the Li content in the green sheet containing the excess-lithium source to the Co content in the green sheet containing the lithium complex oxide is preferably 0.1 or more, more preferably 0.1 to 1.1.

(c) Lamination and Firing of Green Sheets

The green sheet containing the lithium complex oxide (e.g., $LiCoO_2$ green sheet) and the green sheet containing the excess-lithium source (e.g., $Li_2CO_3$ green sheet) are sequentially disposed on a bottom setter, and a top setter is disposed on the green sheets. The top and bottom setters are made of ceramic, preferably zirconia or magnesia. If the setters are made of magnesia, the pores tend to get smaller. The top setter may have a porous structure, a honeycomb structure, or a dense structure. If the top setter has a dense structure, the pores in the sintered plate readily get smaller, and the number of pores tends to get larger. The green sheets disposed between the setters are optionally degreased and heated (fired) in a medium temperature range (e.g., 700 to 1000° C.) to give a lithium complex oxide sintered plate. The resultant sintered plate is also in a form of independent sheet.

(d) Summary

The preferred process described above has the following features or differences from the known methods described in PTLs 1 to 3, and these features or differences are believed to contribute to various characteristics in the lithium complex oxide sintered plate of the present invention.

1) Employment of one-stage process: PTLs 1 to 3 disclose an one-stage process consisting of a first stage involving production of a lithium-containing fired body in a single firing stage without formation of an intermediate fired body, and a two-stage process involving production of a lithium-free intermediate fired body and then introduction of lithium (heat treatment or second firing). In contrast, the preferred process involves the one-stage process.

2) Use of raw material powder of lithium complex oxide: The preferred process uses pre-synthesized particles (e.g., $LiCoO_2$ particles) having a composition $LiMO_2$ (M is as described above) instead of appropriately mixed particles of compounds composed of, for example, Li and Co.

3) Excess use of Li (excess amount: 30 mol % or more): An excess amount of lithium can be present during firing by the use of a green sheet containing an excess-lithium source (an external excess-lithium source) and an excess-lithium source in the green sheet containing the lithium complex oxide (an internal excess-lithium source), resulting in desirably adjusting the porosity even during firing in a medium temperature range. The external excess-lithium source tends to reduce the porosity, while the internal excess-lithium source tends to increase the porosity and the mean pore diameter.

4) Firing in a medium temperature range: Firing in a medium temperature range (e.g., 700 to 1000° C.) causes fine pores to readily remain.

5) Particle diameter distribution of raw material: In the preferred process using no pore-forming agent, more voids are formed between the particles compared to a process using a pore-forming agent, resulting in a wider pore diameter distribution.

6) Setter layout in firing: Firing of the laminated green sheets interposed between two setters enables fine pores to readily remain.

When a laminate battery is manufactured with the sintered plate of the present invention as a positive electrode plate, the sintered plate may be optionally attached to a laminate current collector to improve the contact with the current collector or to avoid the movement of the positive electrode plate inside the battery.

In addition, an electrolytic solution may contain one or more selected from γ-butyrolactone, propylene carbonate, and ethylene carbonate in an amount of 96% by volume or more. Such an electrolytic solution can be used to operate the battery at high temperature, and stably manufacture a battery without deterioration of the battery in manufacturing at high temperature. In particular, in the case that the electrolytic solution contains no ethylene carbonate or at most 20% by volume ethylene carbonate, a ceramic plate of, for example, $Li_4Ti_5O_{12}$ (LTO), $Nb_2TiO_7$, and $TiO_2$, can be suitably employed as a negative electrode material.

In particular, a laminate battery manufactured with the lithium complex oxide sintered plate in the present invention as a positive electrode plate is characterized in that no binder represented by polyvinylidene fluoride (PVDF) is contained, unlike general coated electrodes. Accordingly, an electrolytic solution containing γ-butyrolactone, which has high heat resistance, can be employed in the laminate battery, because the battery contains no binder represented by PVDF, which is decomposed at high temperature (e.g., 80° C. or more). As a result, the battery can be advantageously operated at a high temperature, and manufactured through a high temperature process at about 120° C.

Any negative electrode commonly used in a lithium secondary battery can be employed in the laminate battery manufactured with the lithium complex oxide sintered plate in the present invention as a positive electrode plate. Examples of such common negative electrode materials include carbonaceous materials, metals and metalloids, such as Li, In, Al, Sn, Sb, Bi, and Si, and alloys containing these metals and metalloids. In addition, an oxide-based negative electrode, such as lithium titanate ($Li_4Ti_5O_{12}$), may be used. The oxide-based negative electrode may be prepared by mixing and coating a negative electrode active material, such as lithium titanate, with a binder and a conductive aid, and may be a ceramic plate prepared by sintering a negative electrode active material, such as lithium titanate. In the latter case, the ceramic plate may be dense or may have open pores inside the plate. The use of lithium titanate as the negative electrode layer has an advantage in that the reliability and power output performance are greatly improved as compared with the use of carbonaceous material. In addition, the lithium secondary battery manufactured with a negative electrode of lithium titanate and the lithium complex oxide sintered plate in the present invention exhibits high reliability, such as high cycle performance and high storage performance (less self-discharge), and thereby can be used in series by simple control.

$TiO_2$ or $Nb_2TiO_7$ may be used as the negative electrode active material. In this case, the negative electrode material may be prepared by coating of a mixture of the above negative electrode active material, a binder and a conductive aid, or may be a ceramic plate prepared by sintering the negative electrode active material. In the latter case, the ceramic plate may be dense or may have open pores inside the plate. The use of these materials as the negative electrode layer has an advantage in that the reliability and power output performance are more greatly improved as compared with the use of a carbonaceous material, and also an advantage in that the energy density is higher than the use of lithium titanate material. The use of these materials as the negative electrode layer can exhibit high reliability, such as high cycle performance and high storage performance similar to the use of lithium titanate, and can be readily used in series.

EXAMPLES

The invention will be illustrated in more detail by the following examples.

Example 1

(1) Production of Positive Electrode Plate
(1a) Preparation of $LiCoO_2$ Green Sheet $LiCoO_2$ raw material powder (manufactured by Seido Chemical Industry Co., Ltd.) (hereinafter, referred to as raw material A) (100 parts by weight), a dispersive medium (toluene:2-propanol=1:1) (100 parts by weight), a binder (polyvinyl butyral: Product No. BM-2, manufactured by Sekisui Chemical Co., Ltd.) (10 parts by weight), a plasticizer (di-2-ethylhexyl phthalate (DOP), manufactured by Kurogane Kasei Co., Ltd.) (4 parts by weight), and a dispersant (product name: RHEODOL SP-030, manufactured by Kao Corporation) (2 parts by weight) were mixed. The volume-based D50 particle diameter of raw material A was 5 μm. The mixture was defoamed by stirring under reduced pressure to prepare an $LiCoO_2$ slurry with a viscosity of 4000 cP. The viscosity was measured with an LVT viscometer manufactured by Brookfield. The slurry was molded into an $LiCoO_2$ green sheet onto a PET film by a doctor blade process. The dried thickness of the $LiCoO_2$ green sheet was 100 μm.

(1b) Preparation of $Li_2CO_3$ Green Sheet (Excess-Lithium Source)

$Li_2CO_3$ raw material powder (volume-based particle diameter D50: 2.5 μm, manufactured by The Honjo Chemical Corporation) (100 parts by weight), a binder (poly(vinyl butyral): Product No. BM-2, manufactured by Sekisui Chemical Co., Ltd.) (5 parts by weight), a plasticizer di-2-ethylhexyl phthalate (DOP), manufactured by Kurogane Kasei Co., Ltd.) (2 parts by weight), and a dispersant (RHEODOL SP-030, manufactured by Kao Corporation) (2 parts by weight) were mixed. The mixture was defoamed by stirring under reduced pressure to prepare a $Li_2CO_3$ slurry with a viscosity of 4000 cP. The viscosity was measured with an LVT viscometer manufactured by Brookfield. The $Li_2CO_3$ slurry was molded into a $Li_2CO_3$ green sheet on a PET film by a doctor blade process. The dried thickness of the $Li_2CO_3$ green sheet was designed such that the Li/Co molar ratio of the Li content in the $Li_2CO_3$ green sheet to the Co content in the $LiCoO_2$ green sheet is 0.5.

(1c) Preparation of Sintered $LiCoO_2$ Plate

The $LiCoO_2$ green sheet was separated from the PET film, and was cut into a 50 mm square. The cut piece was placed on the center of a bottom magnesia setter (dimensions: 90 mm square, height: 1 mm). The $Li_2CO_3$ green sheet, which was an excess-lithium source, was placed on the $LiCoO_2$ green sheet, and a porous top magnesia setter was placed thereon. The green sheets disposed between the top and bottom setters were placed into an alumina sheath of a 120 mm square (manufactured by Nikkato Co., Ltd.). At this time, the alumina sheath was not tightly sealed, and was covered with a lid with a gap of 0.5 mm. The laminate was heated to 600° C. at a heating rate of 200° C./h, and was degreased for three hours. The laminate was then heated to 900° C. at 200° C./h, and was kept for 20 hours to fire. After the firing, the fired laminate was cooled to room temperature, and was removed from the alumina sheath. Thus, the sintered $LiCoO_2$ plate was yielded as a positive electrode plate. The positive electrode plate was shaped with a laser into a square of 9 mm by 9 mm.

(2) Manufacturing of Battery

The positive electrode plate, a separator, and a carbonaceous negative electrode were disposed in sequence to prepare a laminate. The laminate was immersed in an electrolytic solution to manufacture a laminate battery. The electrolytic solution was a solution of $LiPF_6$ (1 mol/L) in equivolume mixed solvent of ethylene carbonate (EC) and diethyl carbonate (DEC). The separator was a 25 μm-thick single-layer membrane made of porous polypropylene (Celgard 2500™, manufactured by Celgard, LLC).

(3) Evaluation

The sintered $LiCoO_2$ plate (positive electrode plate) prepared in Procedure (1c) and the battery manufactured in Procedure (2) were evaluated for various properties as shown below.

<Porosity>

The sintered $LiCoO_2$ plate was polished with a cross-section polisher (CP) (IB-15000CP, manufactured by JEOL Ltd.), and the cross-section of the positive electrode plate was observed with SEM (JSM 6390 LA, manufactured by JEOL Ltd.) at a 1000-fold field of view (125 μm×125 μm). The SEM image was subjected to an image analysis, the area of all pores was divided by the area of the positive electrode, and the resultant value was multiplied by 100 to calculate the porosity (%).

<Mean Pore Diameter>

The distribution of volume-based pore diameters in the sintered $LiCoO_2$ plate was measured by a mercury intrusion method using a mercury porosimeter (Autopore IV 9510, manufactured by Shimadzu Corporation). The volume-based D50 pore diameter was measured from the resultant distribution curve of the pores to determine a mean pore diameter where the abscissa indicates the pore diameter and the ordinate indicates the cumulative volume percent.

<Open Pore Rate>

The open pore rate of the sintered $LiCoO_2$ plate was determined by the Archimedes method. In detail, the closed porosity was determined from the apparent density measured by the Archimedes method, and the total porosity was determined from the bulk density measured by the Archimedes method. The open pore rate was then determined from the closed porosity and the total porosity by the following expression:

(open pore rate) = (open porosity)/(total porosity)

= (open porosity)/[(open porosity) + (closed porosity)]

= [(total porosity) − (closed porosity)]/(total porosity)

<Diameter of Primary Grains>

The sintered $LiCoO_2$ plate was polished with a cross section polisher (CP) (IB-15000CP, manufactured by JEOL Ltd.), and the cross-section of the positive electrode plate was observed with SEM (JSM 6390 LA, manufactured by JEOL Ltd.) at a 1000-fold field of view (125 μm×125 μm). At this time, a field of view containing 20 or more primary grains was selected. Circumscribed circles were drawn around all the primary grains in the resultant SEM image to measure the diameters of the circumscribed circles, and a mean value of the diameters was determined as a primary grain diameter.

<Thickness>

The sintered $LiCoO_2$ plate was polished with a cross section polisher (CP) (IB-15000CP, manufactured by JEOL Ltd.), and the resultant cross-section of positive electrode plate was observed with SEM (JSM 6390 LA, manufactured by JEOL Ltd.) to determine a thickness of the positive electrode plate. The thickness of the dried $LiCoO_2$ green sheet described above in Procedure (1a) was also determined in the same manner.

<Degree of Orientation>

Using an X-ray diffractometer (XRD) (RINT-TTR III, manufactured by Rigaku Corporation), the surface (plate face) of the sintered $LiCoO_2$ plate was irradiated with X-rays to give an XRD profile. The ratio [003]/[104] of the diffraction intensity on the (003) plane to the diffraction intensity on the (104) plane in X-ray diffractometry was defined as the degree of orientation.

<Pore Diameter Distribution>

The distribution of volume-based pore diameters in the sintered $LiCoO_2$ plate was measured by a mercury intrusion method using a mercury porosimeter (Autopore IV 9510, manufactured by Shimadzu Corporation). The volume-based D10, D50 and D90 pore diameters were measured from the pore diameter distribution curve where the abscissa indicates the pore diameter and the ordinate indicates the cumulative volume percent, and the ratios D50/D10, D90/D50, and D90/D10 were calculated. The number of peaks was counted in the pore diameter distribution (frequency distribution) where the abscissa indicates the pore diameter and the ordinate indicates the volume percent. In this measurement, each peak was determined from an inflection point where the volume percent continuously increases or decreases at ten points or more before and after the inflection point in the pore diameter distribution.

<Capacity Retention after Bending Test>

The initial discharge capacity of the battery was measured. The battery was charged at a rate of 0.2 C under a constant current until the battery voltage reached 4.2 V, was charged under a constant voltage until the current value reached a rate of 0.02 C, and then was discharged at a rate of 0.2 C until the voltage reached 3.0 V. This charge/discharge cycle was repeated three times in total to measure the discharge capacities. The averaged value of the discharge capacities was defined as an initial discharge capacity. The battery was then bent in accordance with JIS X 6305-1: 2010, and the discharge capacity of the battery after bending was measured as described above. The ratio of the discharge capacity of the battery after bending to the initial discharge capacity of the battery before bending was calculated and multiplied by 100 to give a capacity retention (%) after the bending test.

<Capacity Retention after High-Rate Charge/Discharge Cycles>

The capacity retention of a battery after high-rate charge/discharge cycles was measured in the potential range of 4.2 V to 3.0 V by the following procedures.

(i) The battery was charged at a rate of 0.2 C under a constant current until the battery voltage reached 4.2 V, was charged under a constant voltage until the current value reached a rate of 0.02 C, and then was discharged at a rate of 0.2 C until the voltage reached 3.0 V. This charge/discharge cycle was repeated three times in total to measure the discharge capacities. The averaged value was defined as an initial discharge capacity.

(ii) The battery was charged and discharged at a high charge rate of 2 C and a high discharge rate of 2 C fifty times in total.

(iii) The battery was charged at a rate of 0.2 C under a constant current until the battery voltage reached 4.2 V, was charged under a constant voltage until the current reached a rate of 0.02 C, and then was discharged at a rate of 0.2 C until the voltage reached 3.0 V. This charge/discharge cycle was repeated three times in total to measure the discharge capacities. The averaged value was defined as a post-cycle discharge capacity after high-rate charge/discharge cycles.

(iv) The ratio of the post-cycle discharge capacity measured in Procedure (iii) to the initial discharge capacity measured in Procedure (i) was calculated, and the ratio was multiplied by 100 to determine the capacity retention (%) after high-rate charge/discharge cycles.

Example 2

A positive electrode plate and a battery were prepared and evaluated for the various properties as in Example 1 except that 1) the dried thickness of the $Li_2CO_3$ green sheet was designed to have a Li/Co ratio of 0.4, 2) a top honeycomb zirconia setter was used, and 3) a bottom zirconia setter was used.

Example 3

A positive electrode plate and a battery were prepared and evaluated for the various properties as in Example 2 except that $Li_2CO_3$ raw material powder (a volume-based D50 particle diameter of 2.5 μm, manufactured by Honjo Chemical Co., Ltd.) was further added to the $LiCoO_2$ slurry to have an excess-Li/Co ratio of 0.1 in the $LiCoO_2$ green sheet. The excess-Li/Co ratio is the molar ratio of the excess-Li content derived from $Li_2CO_3$ in the $LiCoO_2$ green sheet to the Co content in the $LiCoO_2$ green sheet.

Example 4

A positive electrode plate and a battery were prepared and evaluated for the various properties as in Example 1 except that 1) $LiCoO_2$ raw material powder having a volume-based D50 particle diameter of 0.2 μm (hereinafter, referred to raw material B) was used instead of raw material A, 2) the dried thickness of the $Li_2CO_3$ green sheet was designed to have a Li/Co ratio of 0.4, 3) a top porous zirconia setter was used, and 4) a bottom zirconia setter was used.

Example 5

A positive electrode plate and a battery were prepared and evaluated for the various properties as in Example 1 except that 1) $LiCoO_2$ raw material powder having a volume-based D50 particle diameter of 15 μm, produced through firing at 700° C. (hereinafter, referred to raw material C), was used instead of raw material A, 2) the dried thickness of the $Li_2CO_3$ green sheet was designed to have a Li/Co ratio of 0.3, 3) $Li_2CO_3$ raw material powder (a volume-based D50 particle diameter of 2.5 μm, manufactured by The Honjo Chemical Corporation) was further added to the $LiCoO_2$ slurry to have an excess-Li/Co ratio of 0.3 in the $LiCoO_2$ green sheet, 4) a top dense magnesia setter (density: 90% or more) was used, and 5) a bottom zirconia setter was used.

Example 6

A positive electrode plate and a battery were prepared and evaluated for the various properties as in Example 1 except that 1) $LiCoO_2$ raw material powder having a volume-based D50 particle diameter of 3 μm (hereinafter, referred to raw material D) was used instead of raw material A, 2) $Li_2CO_3$ raw material powder (a volume-based D50 particle diameter of 2.5 μm, manufactured by The Honjo Chemical Corporation) was further added to the $LiCoO_2$ slurry to have an excess-Li/Co ratio of 0.1 in the $LiCoO_2$ green sheet, 3) firing temperature was 950° C. instead of 900° C. to produce the sintered $LiCoO_2$ plate.

Example 7

A positive electrode plate and a battery were prepared and evaluated for the various properties as in Example 2 except that the $LiCoO_2$ green sheet was formed to have a dried thickness of 200 μm

Example 8

A positive electrode plate and a battery were prepared and evaluated for the various properties as in Example 2 except that the $LiCoO_2$ green sheet was formed to have a dried thickness of 80 μm.

Example 9

A positive electrode plate and a battery were prepared and evaluated for the various properties as in Example 2 except that the $LiCoO_2$ green sheet was formed to have a dried thickness of 50 μm.

Example 10

A positive electrode plate and a battery were prepared and evaluated for the various properties as in Example 1 except that 1) raw material A was replaced with raw material powder (hereinafter, referred to as raw material E) that was produced at a firing temperature of 900° C. as in raw material C, 2) the dried thickness of the $Li_2CO_3$ green sheet was designed to have a Li/Co ratio of 0.4.

Example 11

A positive electrode plate and a battery were prepared and evaluated for the various properties as in Example 2 except that 1) raw material B was used instead of raw material A, and 2) $Li_2CO_3$ raw material powder (a volume-based D50 particle diameter of 2.5 μm, manufactured by The Honjo Chemical Corporation) was further added to the $LiCoO_2$ slurry to have an excess-Li/Co ratio of 0.1 in the $LiCoO_2$ green sheet.

Example 12

A positive electrode plate and a battery were prepared and evaluated for the various properties as in Example 2 except that raw material A was replaced with raw material powder produced by pulverizing raw material C with a ball mill (hereinafter, referred to as raw material F).

Example 13

A positive electrode plate and a battery were prepared and evaluated for the various properties as in Example 2 except that raw material A was replaced with synthetic raw material powder produced by reaction of $Co(OH)_2$ spherically synthesized by coprecipitation with LiOH at 800° C. (hereinafter, referred to as raw material G).

Example 14

A positive electrode plate and a battery were prepared and evaluated for the various properties as in Example 2 except that raw material A was replaced with mixed raw material powder produced by uniformly mixing raw materials A, D and E (hereinafter, referred to as raw material H).

Example 15

A positive electrode plate and a battery were prepared and evaluated for the various properties as in Example 2 except that 1) the dried thickness of the $Li_2CO_3$ green sheet was designed to have a Li/Co ratio of 0.5, and 2) firing temperature was 800° C. instead of 900° C. to produce the sintered $LiCoO_2$ plate.

Example 16 (Comparative)

A positive electrode plate and a battery were prepared and evaluated for the various properties as in Example 2 except that 1) 7.5 wt % fibrous pore-forming material (Celish PC10S, manufactured by Daicel Finechem Ltd.) was further added to the $LiCoO_2$ slurry, 2) $Li_2CO_3$ raw material powder (a volume-based D50 particle diameter of 2.5 μm, manufactured by The Honjo Chemical Corporation) was further added to the $LiCoO_2$ slurry to have an excess-Li/Co ratio of 0.3 in the $LiCoO_2$ green sheet, 3) the $Li_2CO_3$ green sheet and the top setter (a porous magnesia setter) are not placed, and 4) firing temperature was 1200° C. instead of 900° C. to produce the sintered LiCoO$_2$ plate.

Example 17 (Comparative)

A positive electrode plate and a battery were prepared and evaluated for the various properties as in Example 2 except that 1) a Co$_3$O$_4$ green sheet containing 5 wt % Bi$_2$O$_3$ based on Co$_3$O$_4$ as an aid was used instead of the LiCoO$_2$ green sheet, 2) prior to firing at 900° C. for 20 hours, the Co$_3$O$_4$ green sheet was fired at 1300° C. for five hours without lamination of the Li$_2$CO$_3$ green sheet, and 3) the top setter (a porous magnesia setter) was not placed.

Process Conditions and Results of Evaluation

Table 1 shows the process conditions in Examples 1 to 17, and Table 2 shows the results of evaluation in Examples 1 to 17. The raw materials A to H shown in Table 1 are characterized in the respective examples. The particle diameters of the raw material powders shown below were measured by a laser diffraction/scattering particle diameter distribution measuring device (Microtrac MT 3000 II, manufactured by MicrotracBell Corporation).

Raw material A: LiCoO$_2$ raw material powder having a volume-based D50 particle diameter of 5 μm Raw material B: LiCoO$_2$ raw material powder having a volume-based D50 particle diameter of 0.2 μm Raw material C: LiCoO$_2$ raw material powder, produced through firing at 700° C., having a volume-based D50 particle diameter of 15 μm Raw material D: LiCoO$_2$ raw material powder having a volume-based D50 particle diameter of 3 μm Raw material E: raw material powder produced as in raw material C except for the firing temperature of 900° C.

Raw material F: raw material powder produced by pulverizing raw material C with a ball mill Raw material G: synthetic raw material powder produced by reaction of Co(OH)$_2$ spherically synthesized by coprecipitation with LiOH at 800° C.

Raw material H: mixed raw material powder produced by uniformly mixing raw materials A, D and E

TABLE 1

| | Number of firing operations | Raw material powder | Raw material particle diameter D$_{50}$ (μm) | Raw material | Thickness of plate (μm) | Internal excess-lithium source Excess-Li/Co ratio corresponding to Li$_2$CO$_3$ content in LiCoO$_2$ green sheet | External excess-lithium source Li/Co ratio corresponding to Li$_2$CO$_3$ content in Li$_2$CO$_3$ green sheet | Firing conditions | Top setter Material | Top setter Structure | Bottom setter Material |
|---|---|---|---|---|---|---|---|---|---|---|---|
| Ex. 1 | 1 | LiCoO$_2$ | 5 | A | 100 | — | 0.5 | 900° C. × 20 h | MgO | porous | MgO |
| Ex. 2 | 1 | LiCoO$_2$ | 5 | A | 100 | — | 0.4 | 900° C. × 20 h | ZrO$_2$ | honeycomb | ZrO$_2$ |
| Ex. 3 | 1 | LiCoO$_2$ | 5 | A | 100 | 0.1 | 0.4 | 900° C. × 20 h | ZrO$_2$ | honeycomb | ZrO$_2$ |
| Ex. 4 | 1 | LiCoO$_2$ | 0.2 | B | 100 | — | 0.4 | 900° C. × 20 h | ZrO$_2$ | porous | ZrO$_2$ |
| Ex. 5 | 1 | LiCoO$_2$ | 15 | C | 100 | 0.3 | 0.3 | 900° C. × 20 h | MgO | dense | ZrO$_2$ |
| Ex. 6 | 1 | LiCoO$_2$ | 3 | D | 100 | 0.1 | 0.5 | 950° C. × 20 h | MgO | porous | MgO |
| Ex. 7 | 1 | LiCoO$_2$ | 5 | A | 200 | — | 0.4 | 900° C. × 20 h | ZrO$_2$ | honeycomb | ZrO$_2$ |
| Ex. 8 | 1 | LiCoO$_2$ | 5 | A | 80 | — | 0.4 | 900° C. × 20 h | ZrO$_2$ | honeycomb | ZrO$_2$ |
| Ex. 9 | 1 | LiCoO$_2$ | 5 | A | 50 | — | 0.4 | 900° C. × 20 h | ZrO$_2$ | honeycomb | ZrO$_2$ |
| Ex. 10 | 1 | LiCoO$_2$ | 15 | E | 100 | — | 0.4 | 900° C. × 20 h | MgO | porous | MgO |
| Ex. 11 | 1 | LiCoO$_2$ | 0.2 | B | 100 | 0.1 | 0.4 | 900° C. × 20 h | ZrO$_2$ | honeycomb | ZrO$_2$ |
| Ex. 12 | 1 | LiCoO$_2$ | 5 | F | 100 | — | 0.4 | 900° C. × 20 h | ZrO$_2$ | honeycomb | ZrO$_2$ |
| Ex. 13 | 1 | LiCoO$_2$ | 3 | G | 100 | — | 0.4 | 900° C. × 20 h | ZrO$_2$ | honeycomb | ZrO$_2$ |
| Ex. 14 | 1 | LiCoO$_2$ | 9 | H | 100 | — | 0.4 | 900° C. × 20 h | ZrO$_2$ | honeycomb | ZrO$_2$ |
| Ex. 15 | 1 | LiCoO$_2$ | 5 | A | 100 | — | 0.5 | 800° C. × 20 h | ZrO$_2$ | honeycomb | ZrO$_2$ |
| Ex. 16 * | 1 | LiCoO$_2$ | 5 | A | 100 | 0.3 | — | 1200° C. × 20 h | — | — | ZrO$_2$ |
| Ex. 17 * | 2 | Co$_3$O$_4$ | 1.2 | — | 100 | — | 1.1 | 900° C. × 20 h | — | — | ZrO$_2$ |

* Comparative example

TABLE 2

| | Porosity (%) | Mean pore diameter (μm) | Open pore rate (%) | Primary grain diameter (μm) | Thickness of plate (μm) | Degree of orientation | Pore diameter distribution D50/D10 | Pore diameter distribution D90/D50 | Pore diameter distribution D90/D10 | Number of peaks | Capacity retention after bending test (%) | Capacity retention after high-rate charge/discharge (%) |
|---|---|---|---|---|---|---|---|---|---|---|---|---|
| Ex. 1 | 5 | 0.7 | 90 | 2.1 | 100 | 1.5 | 7.0 | 4.3 | 30.0 | 1 | 97.6 | 97.2 |
| Ex. 2 | 15 | 0.6 | 95 | 2.0 | 100 | 1.5 | 6.0 | 5.0 | 30.0 | 1 | 98.1 | 97.8 |
| Ex. 3 | 28 | 0.8 | 95 | 1.8 | 100 | 1.5 | 8.0 | 3.8 | 30.0 | 1 | 98.5 | 98.1 |
| Ex. 4 | 15 | 0.3 | 95 | 1.2 | 100 | 1.5 | 6.0 | 6.7 | 40.0 | 1 | 99.0 | 98.3 |
| Ex. 5 | 15 | 10.0 | 95 | 3.0 | 100 | 1.5 | 16.7 | 3.0 | 50.0 | 1 | 99.5 | 98.7 |
| Ex. 6 | 15 | 0.7 | 70 | 2.5 | 100 | 1.5 | 6.0 | 5.0 | 30.0 | 1 | 98.0 | 98.0 |
| Ex. 7 | 15 | 0.6 | 95 | 2.0 | 190 | 1.5 | 6.0 | 5.0 | 30.0 | 1 | 98.2 | 96.5 |
| Ex. 8 | 15 | 0.7 | 95 | 2.0 | 80 | 1.5 | 7.0 | 4.3 | 30.0 | 1 | 98.0 | 98.3 |
| Ex. 9 | 15 | 0.6 | 95 | 2.0 | 50 | 1.5 | 6.0 | 5.0 | 30.0 | 1 | 97.5 | 98.5 |
| Ex. 10 | 15 | 2.5 | 95 | 15.0 | 100 | 1.5 | 8.3 | 3.6 | 30.0 | 1 | 99.2 | 98.4 |

TABLE 2-continued

|  | Porosity (%) | Mean pore diameter (μm) | Open pore rate (%) | Primary grain diameter (μm) | Thickness of plate (μm) | Degree of orientation | Pore diameter distribution | | | Number of peaks | Capacity retention after bending test (%) | Capacity retention after high-rate charge/ discharge (%) |
|---|---|---|---|---|---|---|---|---|---|---|---|---|
|  |  |  |  |  |  |  | D50/D10 | D90/D50 | D90/D10 |  |  |  |
| Ex. 11 | 15 | 0.7 | 95 | 0.5 | 100 | 1.5 | 7.0 | 4.3 | 30.0 | 1 | 98.0 | 98.0 |
| Ex. 12 | 15 | 0.7 | 95 | 2.0 | 100 | 4.8 | 7.0 | 4.3 | 30.0 | 1 | 98.0 | 98.2 |
| Ex. 13 | 15 | 0.7 | 95 | 2.2 | 100 | 0.3 | 7.0 | 4.3 | 30.0 | 1 | 98.0 | 98.0 |
| Ex. 14 | 15 | 0.7 | 95 | 2.0 | 100 | 1.5 | 7.0 | 17.1 | 12.0 | 1 | 99.8 | 99.0 |
| Ex. 15 | 15 | 0.8 | 95 | 2.0 | 100 | 1.5 | 3.0 | 2.8 | 8.3 | 1 | 85.0 | 90.0 |
| Ex. 16 * | 15 | 0.6 | 95 | 2.0 | 100 | 1.5 | 1.2 | 1.5 | 1.8 | 1 | Short circuit | 65.0 |
| Ex. 17 * | 15 | 0.6 | 95 | 0.8 | 100 | 1.5 | 1.5 | 1.9 | 2.9 | 1 | 55.0 | 60.0 |

* Comparative example

What is claimed is:

1. A lithium complex oxide sintered plate for use in a positive electrode of a lithium secondary battery, wherein the lithium complex oxide sintered plate has a structure in which a plurality of primary grains having a layered rock-salt structure are bonded, and has:
    a porosity of 3 to 30%,
    a mean pore diameter of 15 μm or less,
    an open pore rate of 70% or more, and
    a thickness of 40 to 200 μm,
    a primary grain diameter of 20 μm or less, the primary grain diameter being a mean diameter of the primary grains, and
    a pore diameter distribution in which the number of peaks is one and volume-based D10, D50 and D90 pore diameters satisfy expressions: D50/D10≥2.5, D90/D50≥2.5, and D90/D10≥8.0,
    wherein D10, D50, and D90 are determined using a cumulative pore diameter distribution.

2. The lithium complex oxide sintered plate according to claim 1, having a ratio [003]/[104] of 5.0 or less where the ratio [003]/[104] indicates a ratio of the diffraction intensity on the (003) plane to the diffraction intensity on the (104) plane in X-ray diffractometry.

3. The lithium complex oxide sintered plate according to claim 2, having a thickness of 80 to 200 μm.

4. The lithium complex oxide sintered plate according to claim 2, having a thickness of 100 to 200 μm.

5. The lithium complex oxide sintered plate according to claim 1, having a thickness of 80 to 200 μm.

6. The lithium complex oxide sintered plate according to claim 1, having a thickness of 100 to 200 μm.

* * * * *